United States Patent
Cook et al.

[11] Patent Number: 5,841,662
[45] Date of Patent: *Nov. 24, 1998

[54] METHOD AND APPARATUS FOR CHUCKED WORK PIECE RECOGNITION

[75] Inventors: Merritt S. Cook; Raymond D. Gregory, both of Muskogee; Charles C. Brissey, Broken Arrow, all of Okla.

[73] Assignee: Coburn Optical Industries, Inc., Tulsa, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 688,733

[22] Filed: Jul. 31, 1996

[51] Int. Cl.$^6$ ........................................... G06F 19/00
[52] U.S. Cl. ............... 364/474.37; 356/376; 364/474.17; 382/152
[58] Field of Search ................. 364/474.17, 474.16, 364/474.21, 474.37, 468.22, 468.23, 550, 551.01, 551.02, 559; 382/152; 250/559.14, 559.39, 559.44; 356/375, 376, 385, 386, 394, 398; 408/16; 483/9, 12; 702/150, 151

[56] References Cited

U.S. PATENT DOCUMENTS

| | | | |
|---|---|---|---|
| 4,877,970 | 10/1989 | Minamikawa et al. | 356/376 X |
| 4,972,090 | 11/1990 | Eaton | 356/376 X |
| 4,989,316 | 2/1991 | Logan et al. | 29/527.3 |
| 5,004,930 | 4/1991 | Gremaud et a l. | 356/387 X |
| 5,189,481 | 2/1993 | Jann et al. | 356/237 X |
| 5,485,771 | 1/1996 | Brennan | 82/1.11 |
| 5,546,179 | 8/1996 | Cheng | 356/375 X |

FOREIGN PATENT DOCUMENTS

| | | |
|---|---|---|
| 0 447 084 A1 | 9/1991 | European Pat. Off. . |
| 0 532 892 A | 3/1993 | European Pat. Off. . |
| 37 01 124 A1 | 7/1988 | Germany . |

*Primary Examiner*—Joseph Ruggiero
*Attorney, Agent, or Firm*—Frank J. Catalano; Scott R. Zingerman

[57] ABSTRACT

A recognition apparatus and method are provided for identifying the type of work piece loaded onto the rotating shaft chuck of an ophthalmic product generator. A digital electronic system supplies signals which control the angular displacement of the chuck. Each type of work piece has a unique pattern of passages aligned on a plane transverse to its rotational axis which rotate into and out of alignment with a single registration line in the plane. Unique signature data which identifies each type of work piece by the angular positions at which the passages come into and go out of alignment with the registration line is stored in the digital electronic system. A beam of light, preferably infrared, is continuously transmitted along the registration line during a signature rotation of the chuck. The angular positions of the loaded work piece and the status of an electrical signal generated when the light beam passes through the passages are detected and stored in the digital electronic system. The loaded work piece signature data is then sequentially compared with the unique signature data for each type of work piece that could be loaded into the generator. An electronic signal is transmitted by the digital electronic system upon determination of either a match or lack of a match. The transmitted signal may be used to continue or abort the generating process and/or to cause one or more unique messages descriptive of the job status to be visually displayed.

20 Claims, 8 Drawing Sheets

METHOD AND APPARATUS FOR CHUCKED WORK PIECE RECOGNITION

BACKGROUND OF THE INVENTION

This invention relates generally to the generation of ophthalmic products from blanks and more particularly concerns determination of the type of work piece loaded into an ophthalmic product generator.

A method and apparatus for generating ophthalmic lenses and lap tools is disclosed in U.S. Pat. No. 5,485,771 issued on Jan. 23, 1996 to the present assignee. In using the method and apparatus of U.S. Pat. No. 5,485,771, operators sometimes inadvertently load blanks of material onto the generator chuck which are not suited for the job to be performed. For example, a lap blank may be loaded when the job to be performed is the machining of a lens, or conversely, a lens blank may be loaded when the job to be performed is the machining of a lap. To avoid the negative consequences of machining materials at speeds and with clearances inappropriate for either the cutting tool or the work piece, it is desirable that the generator have the ability to recognize or identify the type of blank loaded as being suited to the job to be performed.

Work piece identification for different types of machines has been achieved through the use of extraneous components added to the work piece. For example, magnets attached or inserted at unique locations in a work piece can actuate reed switches in a detection system. However, the addition of extraneous and otherwise unnecessary components is time consuming and increases the cost of each work piece.

It is, therefore, an object of this invention to provide a method and apparatus for detecting the type of work piece loaded into an ophthalmic product generator. Another object of this invention is to provide a method and apparatus for detecting the type of work piece loaded into an ophthalmic product generator which requires no extraneous components to be added to the work piece. It is also an object of this invention to provide a method and apparatus for detecting the type of work piece loaded into an ophthalmic product generator which use a light beam to identify a unique signature inherent in the contour of the loaded work piece. A further object of this invention is to provide a method and apparatus for detecting the type of work piece loaded into an ophthalmic product generator which accomplishes identification during not more than one revolution of the work piece. Yet another object of this invention is to provide a method and apparatus for detecting the type of work piece loaded into an ophthalmic product generator in which detection of an appropriate work piece loaded into the generator permits automatic performance of the job to be accomplished. Still another object of this invention is to provide a method and apparatus for detecting the type of work piece loaded into an ophthalmic product generator in which determination that an improper work piece for the designated job has been loaded into the generator prevents automatic performance of the job.

SUMMARY OF THE INVENTION:

In accordance with the invention, a recognition apparatus and method are provided for identifying the type of work piece loaded onto the rotating shaft chuck of an ophthalmic product generator. A digital electronic system connected to the chuck supplies signals which control the angular displacement of the chuck in relation to a first reference plane which contains or passes through the rotational axis of the chuck. Each type of work piece has a unique pattern of passages aligned on a plane transverse to the rotational axis of the work piece which rotate into and out of alignment with a single registration line in the plane. The planes for each type of work piece intersect the rotational axes of the work pieces so as to be aligned with a second reference plane relative to the chuck rotational axis when the work piece is loaded onto the chuck. The registration lines for each type of work piece are coincident in relation to the rotational axis of the chuck.

Unique signature data is stored in the digital electronic system for each type of work piece that can be loaded on the chuck. The unique signature data identifies the type of work piece by the angular positions of the work piece at which the passages for the work piece come into and go out of alignment with the registration line. A work piece is loaded on the chuck in a reference position relative to the first angular reference plane and the chuck and loaded work piece are rotated for at least a part of one revolution. A beam of light, preferably infrared, is continuously transmitted toward the loaded work piece along the registration line and in the second reference plane during the rotation of the chuck. The portions of the beam of light which pass through the unique pattern of passages in the work piece are received and used to generate corresponding electrical signals. The angular positions of the loaded work piece and the status of the electrical signal as present ("ON") or absent ("OFF") are detected in relation to the first reference plane for each change in status of the electrical signal. The detected status and angular positions are stored in the digital electronic system to provide the signature data by which the loaded work piece can be recognized. The loaded work piece signature data is then sequentially compared with the unique signature data for each type of work piece that could be loaded into the generator. An electronic signal is transmitted by the digital electronic system upon determination of a match of the loaded work piece signature data with the unique signature data for such work pieces.

Preferably, a plurality of unique messages corresponding to each type of work piece is stored in the digital electronic system and the unique message which corresponds to the loaded work piece is electronically transmitted upon determination of a match of the loaded work piece signature data with the unique signature data. Preferably, the transmitted unique message is also visually displayed. In addition, a different electronic signal is transmitted by the digital electronic system upon determination that the loaded work piece signature data does not match any stored unique signature data. In this event, it is preferred that the transmitted electronic signal also causes further rotation of the chuck to be aborted. Preferably, another unique message is also stored in the digital electronic system which is electronically transmitted upon determination that the loaded work piece signature data does not match with any unique signature data. Preferably, this transmitted unique message is also visually displayed.

BRIEF DESCRIPTION OF THE DRAWINGS:

Other objects and advantages of the invention will become apparent upon reading the following detailed description and upon reference to the drawings in which.

While the invention will be described in connection with a preferred embodiment and method, it will be understood that it is not intended to limit the invention to that embodiment and method. On the contrary, it is intended to cover all alternatives, modifications and equivalents as may be included within the spirit and scope of the invention as defined by the appended claims.

Figure 1:
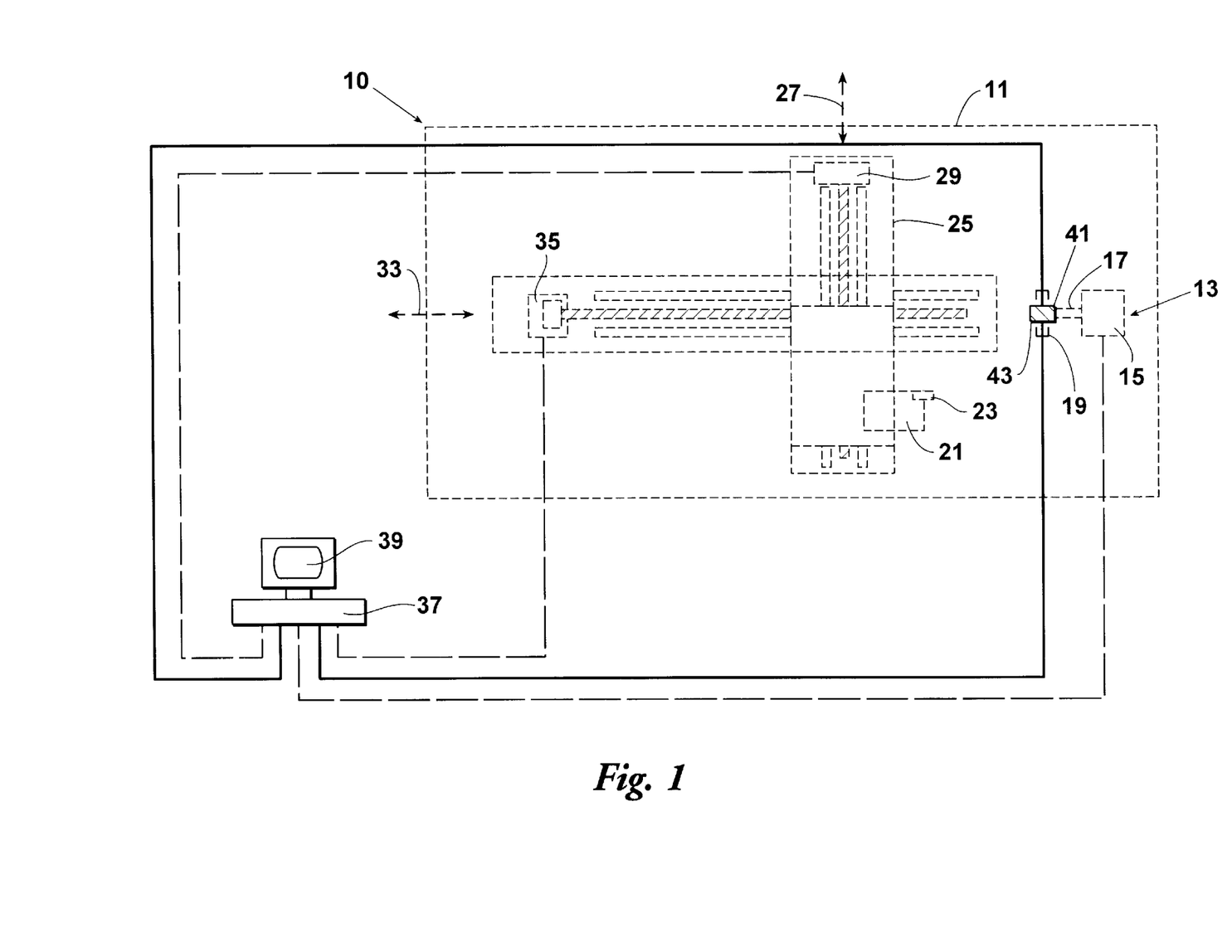
FIG. 1 is a schematic plan view of a preferred embodiment of a recognition apparatus in accordance with the present invention.

DETAILED DESCRIPTION OF THE INVENTION:

Turning first to FIG. 1, the apparatus for chucked work piece recognition is illustrated in association with an ophthalmic product generator 10. The ophthalmic product generator 10 shown is more fully described as one of the embodiments disclosed in U.S. Pat. No. 5,485,771. A thorough description of ophthalmic product generators is presented in that patent and the present invention is not limited to any particular embodiment of the generator. For convenience, the generator 10 shown may be briefly described as including a base 11 supporting a work piece mount 13 and a cutting tool mount 21. The work piece mount 13 is in a fixed position on the base 11. It includes a motor 15 driving a spindle 17 to rotate the work piece mounting chuck 19 about the axis of the spindle 17. The cutting tool mount 21 which supports the cutting tool 23 is, in the embodiment shown, mounted on a Y axis slide 25 reciprocally driven along the Y axis 27 by a drive motor 29. The Y axis slide 25 is in turn mounted on an X axis slide 31 which is reciprocally driven on the X axis 33 by another drive motor 35.

The overall operational control of the ophthalmic product generator is effected by means of a digital electronic system 37, such as a programmable computer. The computer may be a dedicated, stand alone personal computer, and may be advantageously connected to a host computer (not shown). The digital electronic system 37 is connected to the drive motors 15, 29 and 35 and acts to control the position of the cutting tool 23 and the angular position of the spindle 17 and the work piece mounted on the spindle 17.

Figure 2:
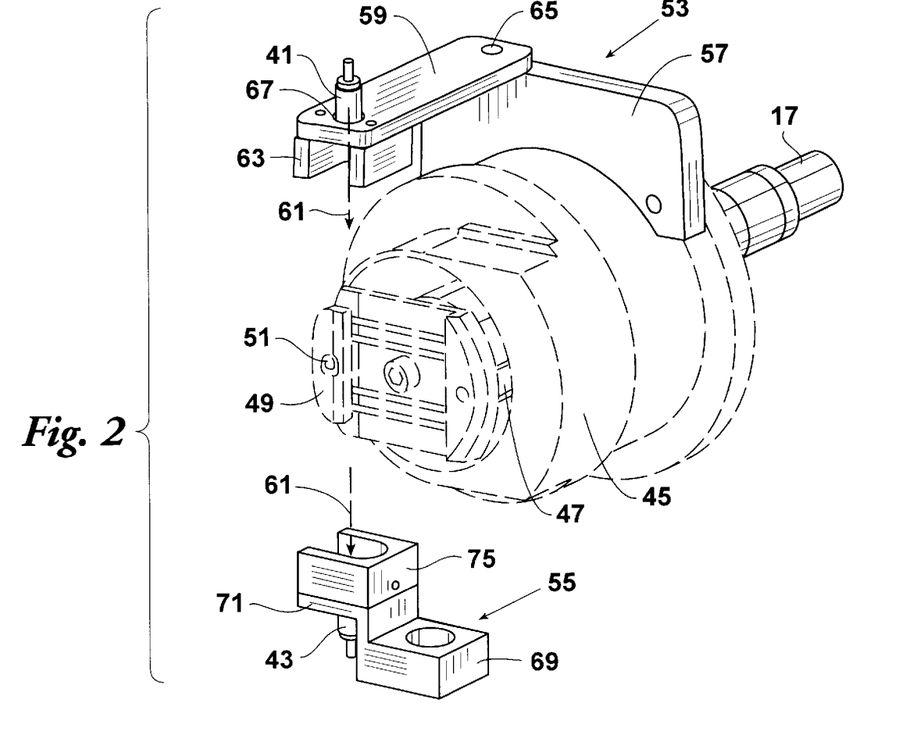
FIG. 2 is a perspective view of the transmitter and receiver components of the recognition apparatus of FIG. 1 mounted on an ophthalmic product generator chuck.
Figure 3:
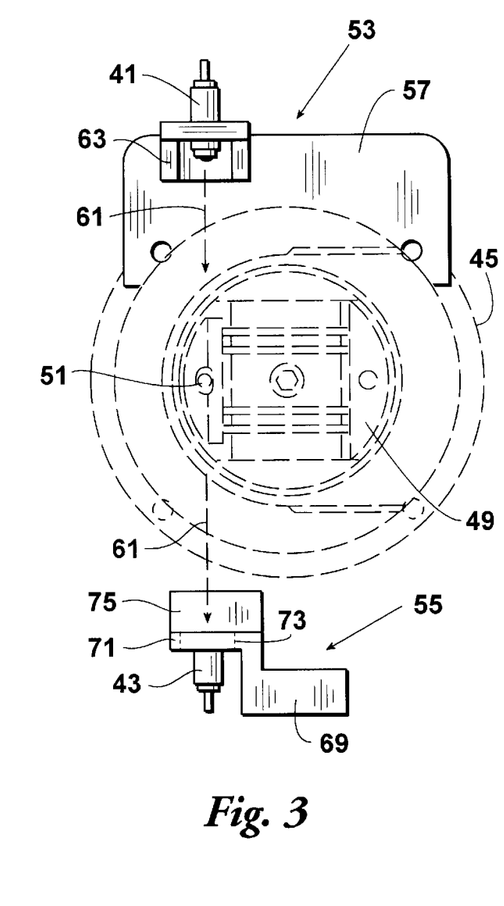
FIG. 3 is a front elevation view of the components of FIG. 2.
Figure 4:
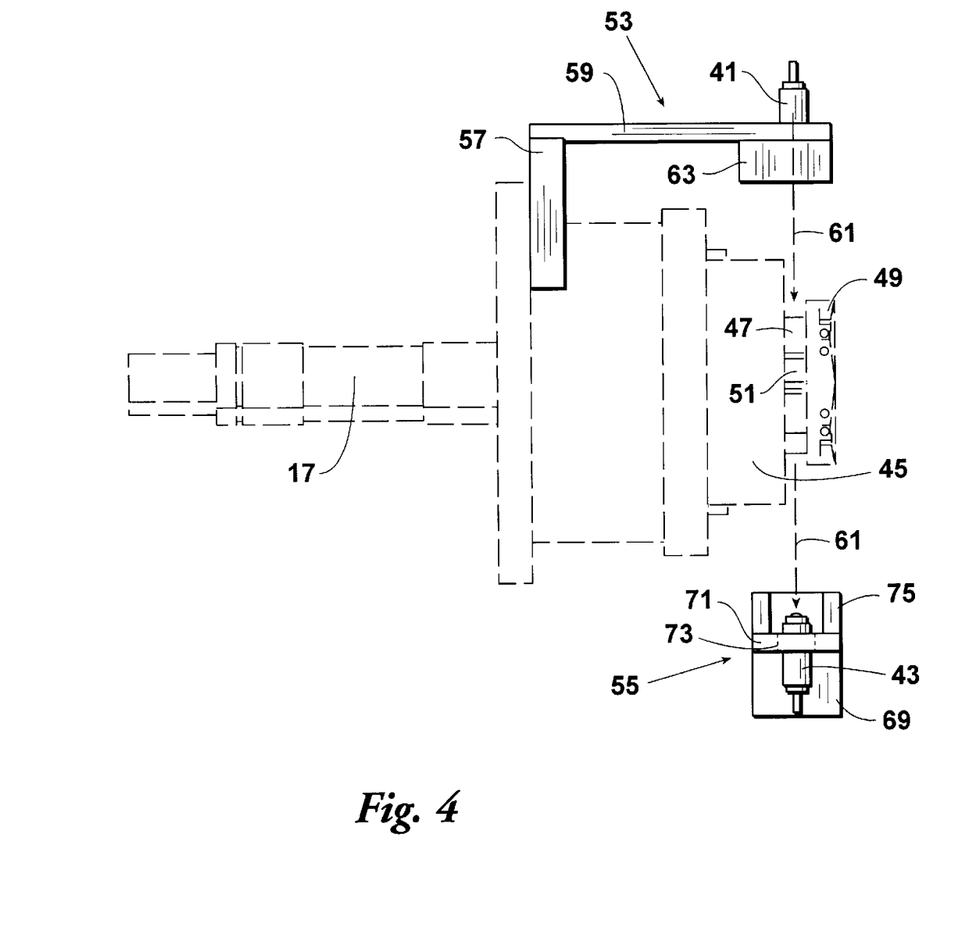
FIG. 4 is a side elevation view of the components of FIG. 2.

As shown in FIG. 1, the present apparatus for chucked work piece recognition includes a light source or transmitter 41 and a light detector or receiver 43 which are physically mounted on the work piece mount 13 and electrically connected to the digital electronic system 37. Looking at FIGS. 2, 3 and 4, a preferred mounting configuration of the transmitter 41 and receiver 43 is illustrated. The chuck housing 45 is mounted in any suitable fashion on the generator base 11. A chuck spindle 17 extends into the housing 45 and is connected to a collet 47 which is in turn connected to a work piece, in this instance an adapter 49 holding a lap blank (not shown) for machining by the generator 10. The term "work piece" as used in this specification and the appended claims is hereinafter explained. The lap adapter 49 shown includes a lever 51 used to lock the lap blank (not shown) in place on the adapter 49. The present invention includes a transmitter mounting bracket 53 and a receiver mounting bracket 55. The embodiment of the transmitter mounting bracket 53 shown includes a plate 57 adapted to be seated on and attached to the chuck housing 45 by screws (not shown) using screw holes already provided in the housing 45. An arm 59 on which the transmitter 41 is mounted extends from the plate 57 so as to position the transmitter 41 to direct a beam of light 61 along a registration line as hereinafter explained. A U-shaped shield or cage 63 fixed to the arm 59 protects the transmitter 41 from debris and provides an air passage to stimulate the blowing of dust and swarf particles resulting from the machining process off the transmitter 41. As shown, the arm 59 is secured to the plate 57 at a pivot point 65 by a screw (not shown) so that the arm 59 can be rotated to any desired angular position in relation to the plate 57. In addition, the transmitter 41 is disposed in an elongated slot 67 in the arm 59 so that it can be shifted radially in relation to the pivot point 65. Thus, the transmitter 41 can be positioned to realign the beam of light 61 as desired. The receiver mounting bracket 55 shown includes a base 69 secured to the generator support base 11 by a screw (not shown). An arm 71 extends from the base 69 and the receiver 43 is mounted in an elongated slot 73 in the arm 71. Another U-shaped shield or cage 75 fixed to the arm 71 protects the receiver 43 from debris and provides an air passage to stimulate the blowing of dust and swarf particles resulting from the machining process off the receiver 43. The receiver bracket 55 is angularly positionable by rotation about the mounting screw (not shown) in the base 69 and the receiver 43 is radially shiftable in the slot 73 in the arm 71 so as to permit the position of the receiver 43 to be adjusted to align with the light beam 61. With respect to the work piece which includes the adapter 49, the light beam 61 is aligned to be intercepted by the lever 51 as the adapter 49 rotates about the spindle axis. It is preferred that the light beam transmitter 41 and receiver 43 be infrared, but this is not required.

Figure 5:
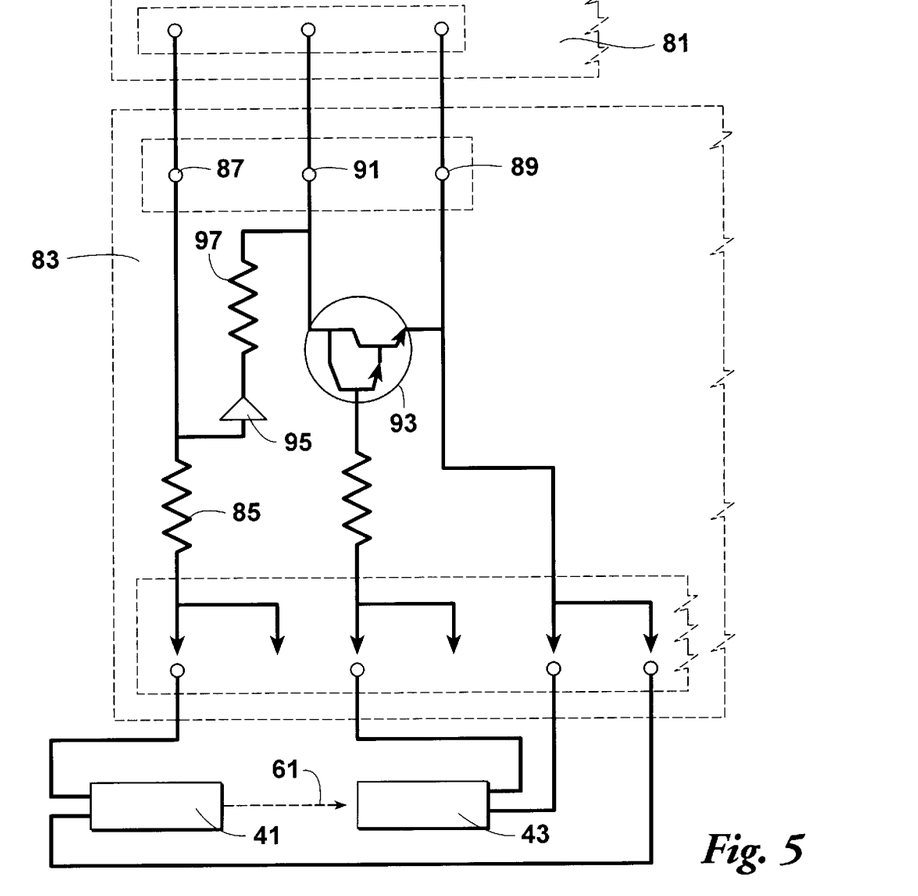
FIG. 5 is a schematic diagram of a preferred embodiment of the electrical detection circuit of the recognition apparatus of FIG. 2.

The sensor circuit of the work piece recognition apparatus is illustrated in FIG. 5. The circuit is connected to the digital electronic system 37 via an amplifier interface module 81 which already exists in the digital electronic system circuitry of the ophthalmic product generator 10. An added probe interface board 83 supplements the digital electronic system 37 and is connected between the transmitter 41 and the receiver 43 and the amplifier interface module 81. One side of the transmitter 41 is connected through a current limiting resistor 85 through an input terminal 87 which is connected to a voltage source (not shown), preferably at 5 volts. The other side of the transmitter 41 is connected through the board 83 to a common terminal 89 and thence to the amplifier interface module 81. A probe terminal 91 of the probe interface board 83 is connected through an amplifier 93 to one side of the receiver 43 while the other side of the receiver 43 is connected to the common terminal 89. The response of the amplifier 93 to the reception of light by the receiver 43 results in transmission of an electronic signal to the digital electronic system 37 when the light beam is received. A light emitting diode 95 is connected with a resistor 97 between the input terminal 87 and the probe terminal 91 to indicate the operating status of the sensor circuit as "ON" or "OFF".

In the ophthalmic product generator disclosed in U.S. Pat. No. 5,485,771, the digital electronic system 37 stores data required for the operation of the generator. Such data typically includes the type of material to be worked upon, the type of curve required to be generated (concave or convex), and the prescription information relating to the curve to be generated. From this information, the digital electronic system 37 has, or generates using algorithms, the control data it requires to effect control of the cutting operation. During the actual cutting operation, the digital electronic system 37 supplies at regular intervals, e.g., every 2 to 4 milliseconds, appropriate drive signals to the motors 15, 29 and 35 controlling the spatial and angular relationship of the work piece to the apparatus cutter tool 23 so that the required surface shape is generated. Thus, in the present invention, the digital electronic system 37 of the generator 10 already has the data necessary to establish the position of the work piece. Furthermore, U.S. Pat. No. 5,485,771 also provides a flow chart of an ophthalmic product generating operation. In that operation, at step 412, a work piece is placed properly in the chuck and a function key is pressed to start the cutting process and, at step 413, it is determined whether the probe mode is on. The preferred process steps of the present work piece recognition method hereinafter described preferably occur between these two steps of the original generator process.

Figure 7:
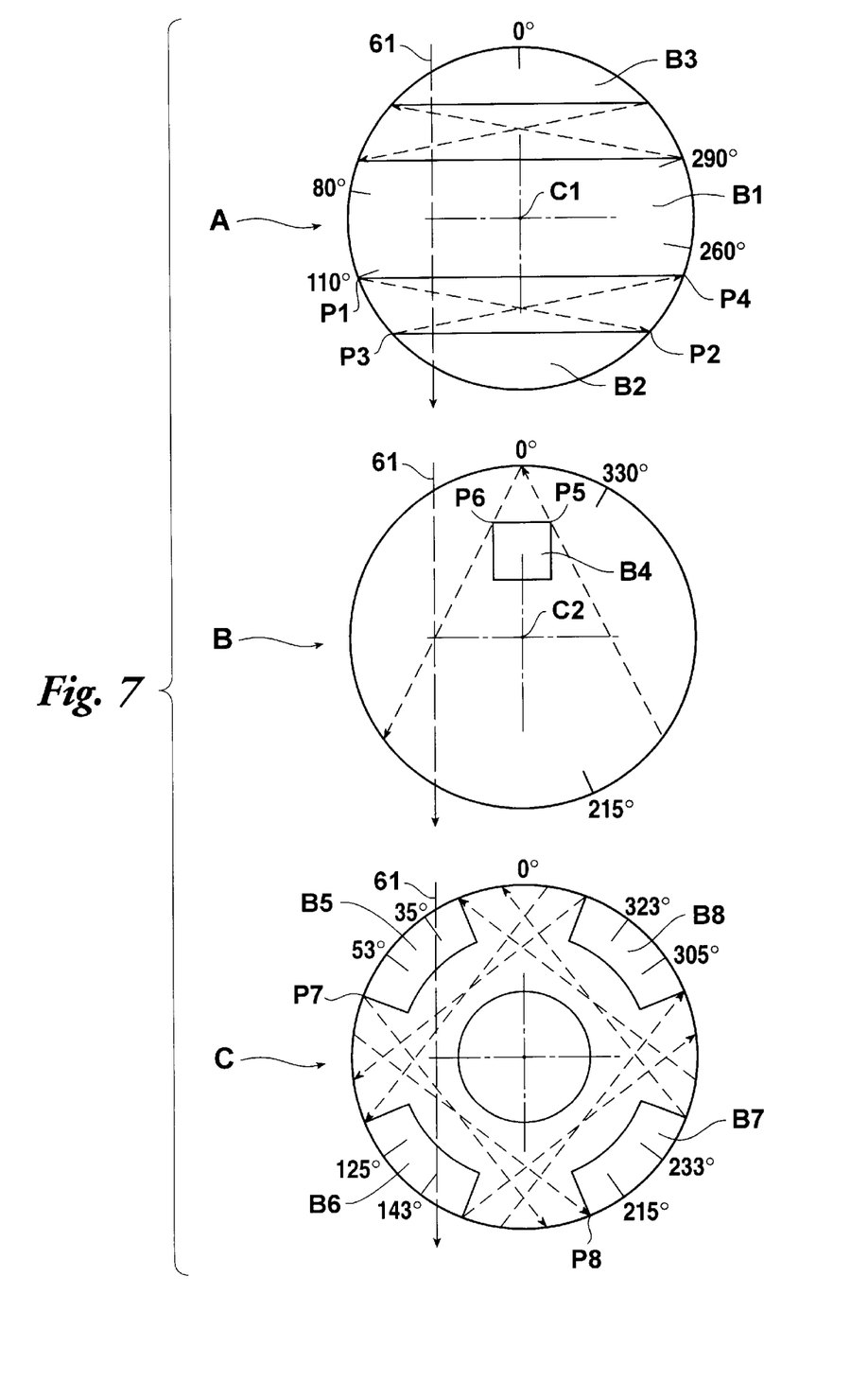
FIG. 7 is a cross-sectional view of several types of work piece taken on a reference plane passing through their unique patterns of passages.

The process steps of the present method of work piece recognition can best be understood in reference to the flow chart of FIG. 7. Two preliminary steps occur in the initialization of the present method. At step 101 the ophthalmic product generator 10 always rotates the chuck to a "spindle to reference" condition. That is, automatically upon start-up of the generator 10, based on previous calibration of the device, the spindle 17 is automatically rotated to an angular zero reference position in relation to a fixed plane containing the axis of rotation of the spindle. With the spindle 17 in this condition, at step 103, "manual chucking" is performed by the operator to secure the work piece to the collet 47 on the spindle 17.

Figure 8:
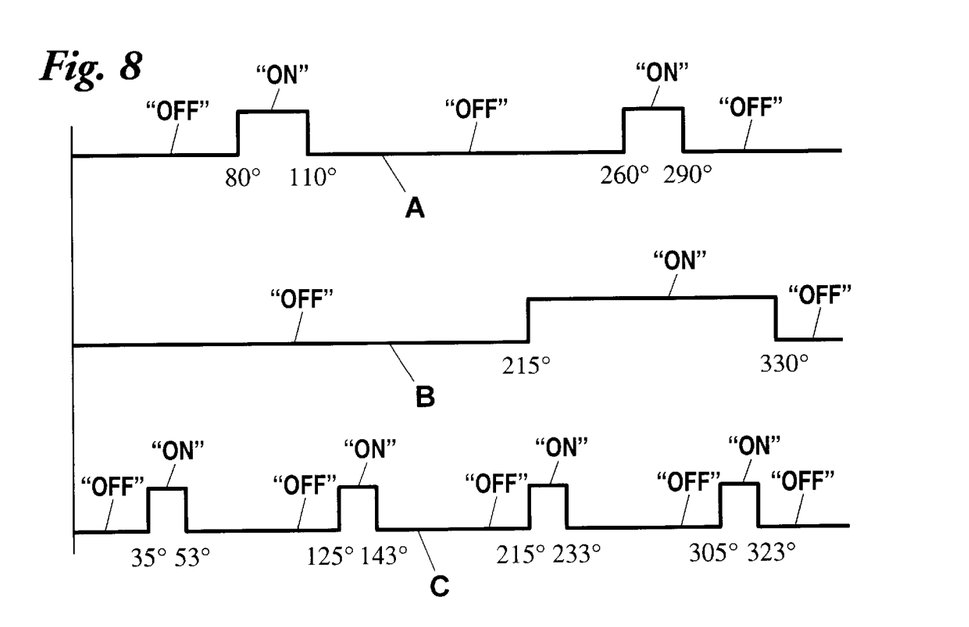
FIG. 8 is a graphic representation of the unique signatures of the several types of work pieces illustrated in FIG. 7.

As used in this specification and the appended claims, "work piece" generally refers to the combination of the blank to be machined, for example a lens blank or lap blank, and any adapter necessary to couple the blank to the collet 47, In addition to the angular position of the spindle 17 and the work piece in relation to the reference plane containing the spindle axis, the work piece, when properly mounted in step 103, will be longitudinally located along the rotational axis of the spindle 17 so that a second reference plane transverse to the spindle axis provides a cross-section of passages inherent in the work piece and providing unique signature data for the type of work piece mounted on the spindle 17. This can best be understood by turning to FIG. 7 which shows the unique passages of three different types of work piece. As used in this specification and the appended claims, "passage" generally indicates a channel defined by imaginary boundaries resulting from interception of a beam of light by one or more blocks rotating into and out of the path of the beam. In FIG. 7, three work pieces A, B and C each have a unique reference plane cross-section as shown. The upper work piece A has three blocks B1, B2 and B3. As the upper work piece A rotates about its center C1 from the zero degree or reference position, the registration line 61 ceases to be intercepted by the center block B1 at the 80 degree position as the trailing point P1 of the center block B1 clears the registration line 61. In the upper work piece A, which happens to be symmetrical about its center C1, clearance of the center block B1 occurs simultaneously with clearance of the outer block B2 at its trailing point P2. When the upper work piece A has rotated to the 110 degree position, the light beam registration line 61 is again intercepted by the second block B2 at its leading point P3 which coincides with the first block B1 leading point P4. Thus, the light beam will pass through the upper work piece A between the 80 and 110 degree rotation points. As the upper work piece A continues to rotate through its 360 degree cycle, the first and third blocks B1 and B3 will cooperate to permit passage of the light beam through the upper work piece A between the 260 and 290 degree angular positions. Looking at FIG. 8, one 360 degree cycle of the upper work piece A applied to the circuit of FIG. 5 results in a unique signature curve A having "ON" conditions between 80 and 110 degrees and between 260 and 290 degrees of rotation. Looking again at FIG. 7, as the middle work piece B rotates about its center C2 from a zero degree reference position, a single block B4 intercepts the light beam registration line 61 at its leading point P5 when the middle work piece B has rotated to the 215 degree position. The single block B4 continues to intercept the registration line 61 until it rotates to the 330 degree position where interception is terminated at its trailing point P6. Referring to FIG. 8, the unique reference plane cross-section of the middle work piece B results in the unique signature curve B which has an "ON" condition from 215 degrees to 330 degrees. Going back to FIG. 7, as the lower work piece C rotates about its center point C3 from the zero degree reference condition, one block B5 intercepts the light beam registration line 61 until the lower work piece C has rotated 35 degrees. At 35 degrees, the trailing point P7 of the block B5 passes the registration line 61 and the light beam is no longer intercepted. This "ON" or uninterrupted condition continues until the lower work piece C has rotated to the 53 degree position at which a leading point P8 on a diagonally opposite block B7 intercepts the light beam to cause an "OFF" condition. The "OFF" condition will continue until another pair of diagonally opposite blocks B6 and B8 cooperate to define a second "ON" condition between 125 degrees and 143 degrees. Similarly, the first pair of blocks B7 and B5 will cooperate to define an "ON" condition between the 215 and 233 degree angular positions while the second pair of blocks B8 and B6 will define a final "ON" condition between the 305 degree and 323 degree angular positions of the lower work piece C. Thus, as seen in FIG. 8, the lower work piece C provides the unique signature curve C having "ON" conditions between 35 and 57 degrees, 125 and 143 degrees, 215 and 233 degrees and 305 and 323 degrees. Thus, it can be seen that any type of work piece may have its own unique signature without introduction of foreign components unnecessary to the work piece. The reinforcing or other necessary structural components of each work piece can be designed to inherently provide the desired signature. In practicing the present invention, the operator will load data identifying the possible types of work piece by angular and signal status into the digital electronic system 37, preferably, but not necessarily, simultaneously with the entry of other data into the system 37.

Figure 6:
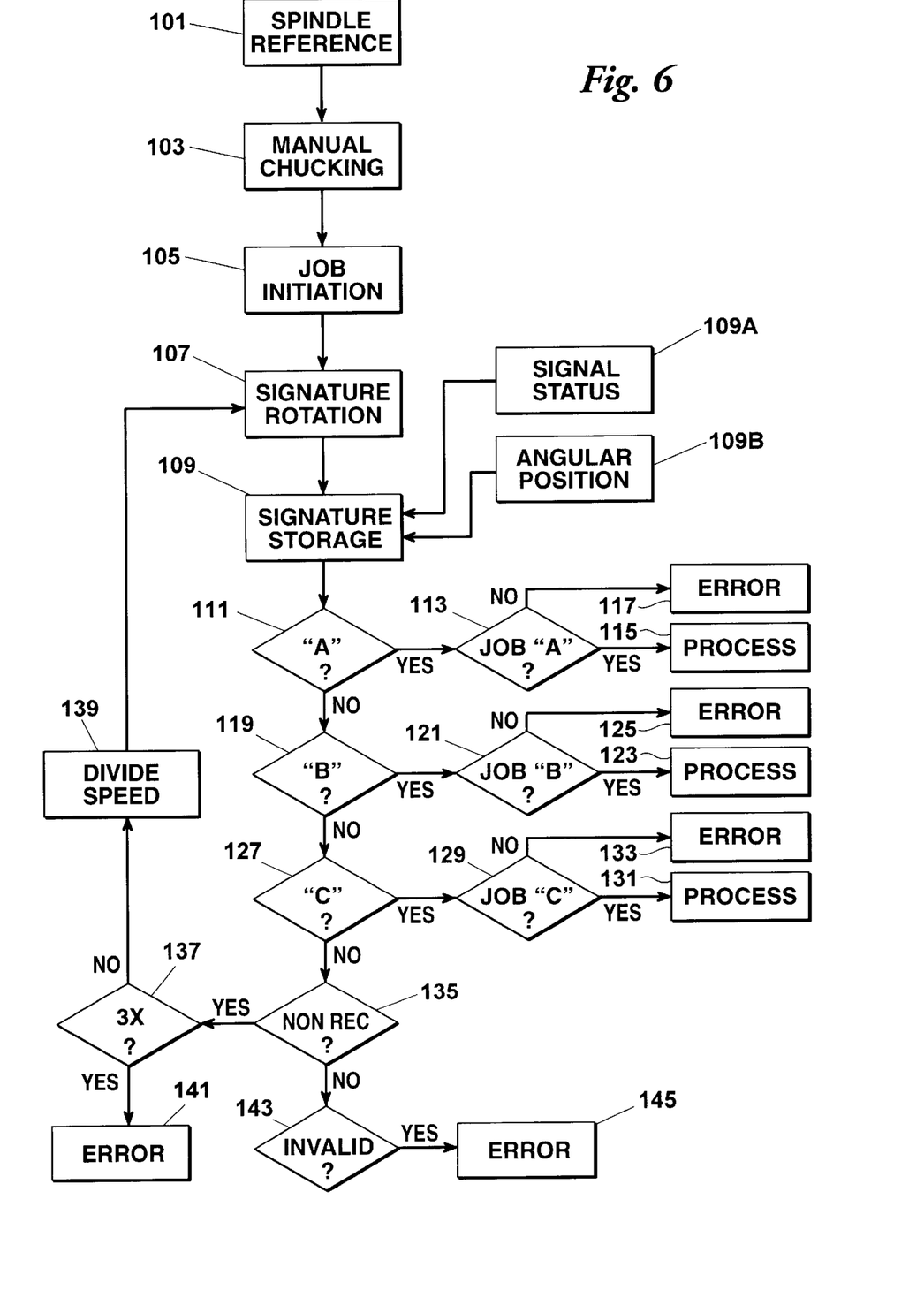
FIG. 6 is a flow chart illustrating a preferred embodiment of a recognition method in accordance with the present invention.

Returning to FIG. 6, after the "manual chucking" of the work piece in step 103, the operator presses a "job initiation"

button at step 105. At step 107, the software of the digital electronics system 37 requires at least part of one revolution or a "signature rotation" of the chucked work piece. At this point, the program could include an optional use bypass step in which the operator would be advised of an the election to bypass the system and be assured of an opportunity to avert the bypass if the election was unintentional. Otherwise, at step 109, "signature storage" of data defining the unique signature of the chucked work piece takes place. This involves the substeps 109A of determining the "signal status" as being in the "ON" (present) or "OFF" (absent) condition and 109B of determining the "angular position" of the chucked work piece in relation to the zero reference plane containing the spindle axis. This monitoring of "signal status" 109A and "angular position" 109B is done in real time during the "signature rotation" 107 by sampling the status of the signal and angular positions as frequently as 1,000 times per second or more. At step 111, the stored signature data of the chucked work piece is compared with the unique signature data of one type of work piece, as shown for the upper work piece "A" of FIG. 7. If the data produces a match, the process proceeds to a step 113 at which the system inquires as to whether "JOB A", which would require the use of a work piece A, is the job to be performed. If the answer to this inquiry is "YES", the process proceeds to a step 115 at which the "process" of generating the desired ophthalmic product will proceed in response to an electronic signal indicating the existence of the match. If, however, the answer to the inquiry is "NO", then the process will proceed to a step 117 at which an indication of "error" will be provided in response to an electronic signal indicating the absence of a match. If, at step 111, the chucked work piece signature data did not match the unique signature data of the work piece type A, then the process would proceed from step 111 to step 119 for comparison with the signature data of a second work piece type "B". If a match is achieved at step 119, then the process would proceed through steps 121, 123 and 125 in similar fashion to the process explained with respect to steps 113, 115 and 117. If, however, at step 119 a match is still not found, then the process will proceed to a step 127 for comparison with the unique signature data of a third work piece type "C" and, if a match is found, then through steps 129, 131 and 133 in the same fashion as explained with respect to steps 113, 115 and 117 above. Finally, if at step 127 no match is found, the process proceeds to step 135 for treatment as a "non-recognized" signal. If the signal is "non-recognized" then the process will proceed via step 137 for several repeated attempts at recognition by return to the "signature rotation" step 107. As shown, this repeat loop is continued three times and, at optional "divide speed" step 139, the rotation speed of the work piece may be divided or reduced to provide better opportunity for signature recognition. If recognition has not occurred within the number of loops required at step 137, then the process will proceed to a step 141 at which an electronic signal will be generated to indicate "error" in that the signature is not recognized. If, at step 135, the signature is clearly not a match for signatures of known types of work piece, the process proceeds to step 143 identifying the signature as "invalid" and then to step 145 for an indication of "error" due to an invalid signature.

While the above process has been described in relation to three types of work pieces, the sequential interrogation pattern illustrated can be applied to any desired number of work piece types. It should also be noted that any number of unique messages can be stored in the digital electronic system 37 for transmission in response to each "error" or "process" step shown in FIG. 6. For example, a diagnostic screen display 39 of the digital electronic system 37 might visually display any one or more of the following types of information:

a. The unique signature of the chucked work piece;

b. The unique signature of the work piece required by the job;

c. A list of the angular positions at which the signature changes from "ON" to "OFF" and "OFF" to "ON";

d. "ERROR: A type A work piece was found in the chuck instead of a type B work piece";

e. "Machine Status: Incorrect work piece found in chuck-cannot continue"; and/or f. any other desired message.

In addition to the visual display of a message indicating the status of the operation, if an incorrect work piece is found in the chuck, continuance of the generation process for the ophthalmic product may also be automatically discontinued or aborted in response to the signal indicating the existence of an "error".

Figure 9:
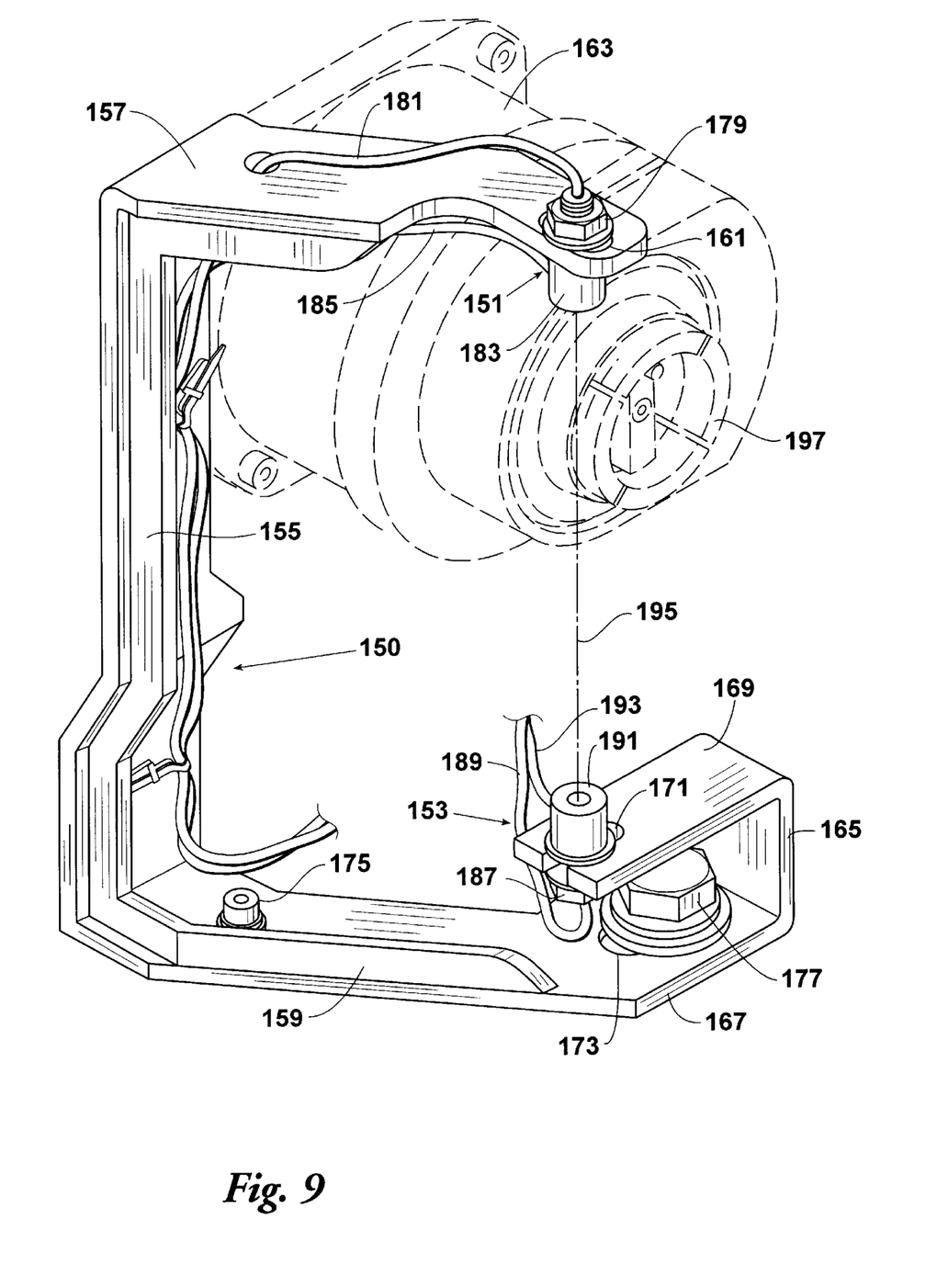
FIG. 9 is a perspective view of a specially preferred embodiment of the recognition apparatus.
Figure 10:
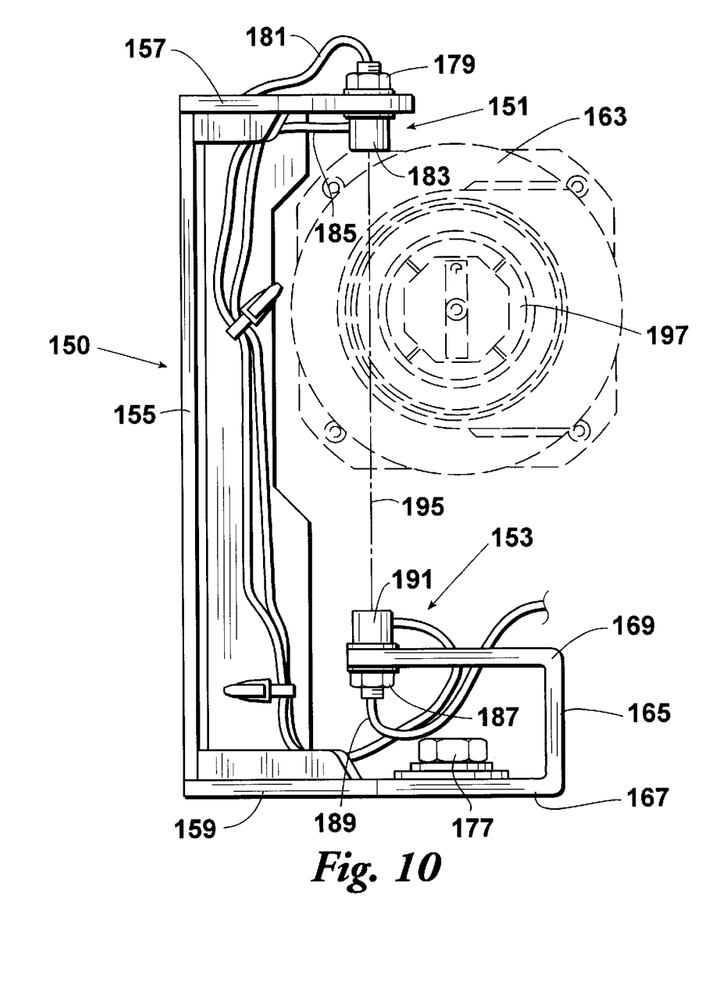
FIG. 10 is a front elevation view of the apparatus of FIG. 9.
Figure 11:
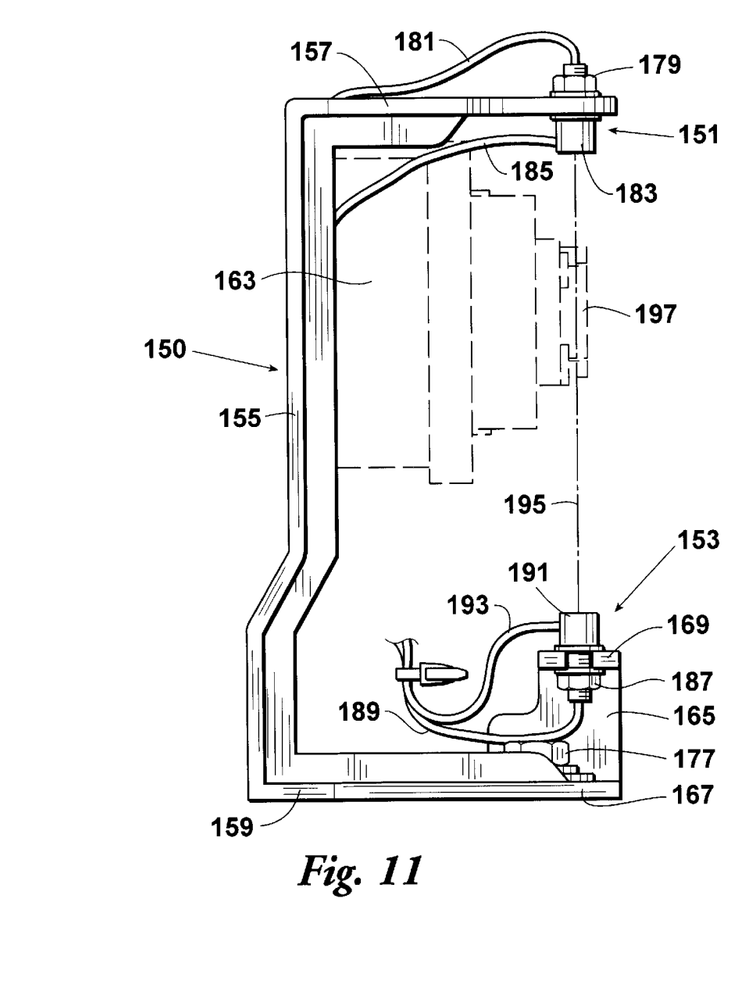
FIG. 11 is a side elevation view of the apparatus of FIG. 9.

Turning to FIGS. 9, 10 and 11, a specially preferred embodiment of the recognition apparatus 150 is illustrated in which the transmitter assembly 151 and the sensor or receiver assembly 153 are mounted on the same bracket. As shown, the bracket consists of a mast 155 having an upper arm 157 extending from its upper end and a lower arm 159 extending from its lower end. The free end of the upper arm 157 is provided with a slot or site hole 161 which, as shown, is elongated in a direction substantially parallel to the rotational axis of the chuck housing 163 with which the apparatus 150 is to be used. The free end of the lower arm 159 is bent into a U-shaped mount 165 having a lower portion 167 in the same plane as the lower arm 159 and an upper portion 169 above and parallel to the lower portion 167. A second elongated slot 171 is provided in the upper portion 169 of the U-shaped mount 165. The second elongated slot 171 is aligned transversely in relation to the first elongated slot 161 in the upper arm 157, for reasons to be hereinafter explained. A third elongated slot 173 is provided in the lower portion 167 of the U-shaped mount 165 and extends in a direction substantially parallel to the second elongated slot 171. The lower arm 159 also has an aperture (not shown) proximate the mast 155. The bracket is secured to the base (not shown) of the ophthalmic product generator by a bracket screw 175 which extends through the aperture in the lower arm 159 into the base and by a mounting bolt 177 which extends through the elongated slot 173 in the lower portion 167 of the U-shaped mount 165 into the base. As shown, the transmitter assembly 151 is secured in a desired position within the first or upper arm slot 161 by the use of a flanged locking nut 179. The electric cable 181 is connected to the transmitter assembly 151 through the flange locking nut 179. A cage 183 protects the transmitter and an air line 185 extends through an aperture in the cage 183 to provide a constant flow of air to keep the transmitter surface clean. Similarly, the receiver assembly 153 is held in position in the second elongated slot 171 in the upper portion 169 of the U-shaped mount 165 by a flanged locking nut 187. An electric cable 189 is connected to the receiver assembly 153 through the flanged locking nut 187. The receiver assembly 153 also includes a cage 191 to which an air line 193 is connected so as to provide a constant flow of air to clean the receiver.

Figure 12:
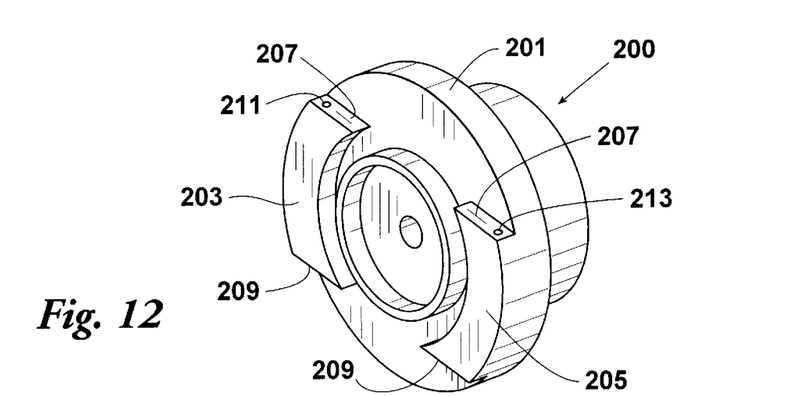
FIG. 12 is a perspective view of an alignment tool for use with the recognition apparatus.

For accurate positioning of the receiver assembly 153, the alignment tool illustrated in FIG. 12 can be installed on the chuck drive 197. As shown, the alignment tool 200 consists of a body portion 201 adapted for connection to the chuck drive 197 and having diagonally opposite lands 203 and 205. The lands 203 and 205 consist essentially of an annular ring on the outer periphery of the body 201 with portions of the ring removed along alignment planes 207 and 209 which are parallel cords symmetrically displaced from the center of the body 201. The first land 203 has a small aperture 211 extending through it and the other land 205 has a large aperture 213 extending through it. The apertures are aligned on cords transverse to the alignment planes 207 and 209 and are symmetrically spaced from the center of the body 201.

In using the alignment tool 200 to mount the recognition apparatus 150 on the ophthalmic product generator, the bracket is set in position on the base and the bracket screw 175 and mounting bolt 177 tightened to a stiff but sliding condition. The receiver assembly 153 is positioned in the second or upper U-shaped mount slot 171 and visually aligned with the first slot 161 in the upper arm 157 by looking through the upper arm slot 157 along the light beam path or sight line 195 and adjusting the position of the assembly 153 accordingly. The receiver assembly flanged locking nut 187 is then finger tightened to secure the receiver assembly 153 in this position. The chuck drive 197 with the tool 200 mounted on it is rotated so that the alignment plane 207 is substantially horizontal and the large aperture 213 extends substantially along the sight line 195 from the transmitter assembly slot 161 to the receiver assembly 153. The positions of the apertures 211 and 213 in the alignment tool 200 are selected to coincide with the desired path of the light beam 195 in relation to the chuck housing 163. Visual sighting is then taken from the transmitter assembly slot 161 through the large or primary sighting aperture 213 in the alignment tool 200 to the sensor of the receiver assembly 153. The position of the receiver assembly 153 is then further adjusted in the receiver assembly slot 171 until all three elements are in vertical alignment. With this positioning of the receiver assembly 153 complete, the flanged locking nut 187 of the receiver assembly 153 is firmly tightened to secure the receiver assembly 153 in place and the bracket screw 175 and mounting bolt 177 are firmly tightened into the base to secure the lower arm 159 of the bracket in place.

The transmitter assembly 151 is then mounted on the transmitter assembly slot 161 and finger tightened to a stiff, but sliding condition. The alignment tool 200 is then rotated 180 degrees so that the small or fine adjustment aperture 211 is substantially aligned on the sight line 195. While watching the diagnostic screen 39 of the digital electronic system 37 as shown in FIG. 1, the position of the transmitter assembly 151 is adjusted until the diagnostic screen display 39 indicates an "open" condition in which the light beam is passing through the fine adjustment aperture 211 and is being detected by the sensor of the receiver assembly 153. The transmitter flanged locking nut 179 is then tightened to secure the transmitter assembly 151 in this position. As a final check, the alignment tool 200 may be rotated several times and the diagnostic screen display 39 should indicate that the light beam has passed through both the fine adjustment aperture 211 and the primary sighting aperture 213, resulting in a display of "open" and "closed" conditions twice in each revolution of the tool 200. Work pieces can then be inserted into the chuck and their unique signature data verified.

By using this specially preferred embodiment of the recognition apparatus, manipulation of a single bracket screw 175 and a single mounting bolt 177 in the lower arm 159 of the bracket is all that is required to secure the recognition apparatus 150 in place and permit adjustment of the recognition apparatus 150 in relation to the base and to the chuck housing 163. In addition, this embodiment eliminates need for a flexing electrical cable traveling with the chuck. Finally, the transverse slots 161 and 171 holding the transmitter assembly 151 and the receiver assembly 153, respectively, permit very fine adjustment of the light beam or sight line 195 to specially align the recognition apparatus 150 to account for machining tolerances in the ophthalmic product generator.

It should be noted that references in this specification to unique signatures are intended to include a range of signatures within an acceptable tolerance depending, for example, on the number of different signatures desired to be detected by the device.

Thus, it is apparent that there has been provided, in accordance with the invention, a method and apparatus for chucked work piece recognition that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition system comprising:

means fixed radially outwardly of the work piece for continuously transmitting a beam of light in a constant non-sweeping path toward the work piece and in the second reference plane during at least a part of one revolution of the chuck; and means fixed radially outwardly of the work piece for receiving portions of said beam of light passing through the unique pattern of passages in the work piece as the work piece rotates through said at least a part of one revolution and for generating electrical signals to the digital electronic means in response thereto.

2. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition system comprising:

means for continuously transmitting a beam of light in a constant non-sweeping path toward the loaded work piece in the second reference plane during at least a part of one revolution of the chuck;

means for receiving all portions of said beam of light which pass through the unique pattern of passages in the loaded work piece as the work piece rotates through said at least a part of one revolution and for generating an electrical signal in response to the received portions of said beam of light;

means in said digital electronic means for detecting angular positions of the loaded work piece and status of said electrical signal as present and absent in relation to the first reference plane for each change in said status of said electrical signal; and means in said digital electronic means for storing said detected status and angular positions as signature data for said loaded work piece.

3. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition system comprising:

unique signature data for each type of work piece stored in the digital electronic means;

means for continuously transmitting a beam of light in a constant non-sweeping path toward the loaded work piece in the second reference plane during at least a part of one revolution of the chuck;

means for receiving all portions of said beam of light which pass through the unique pattern of passages in the loaded work piece as the work piece rotates through said at least a part of one revolution and for generating an electrical signal in response to the received portions of said beam of light;

means in said digital electronic means for detecting angular positions of the loaded work piece and status of said electrical signal as present and absent in relation to the first reference plane for each change in said status of said electrical signal;

means in said digital electronic means for storing said detected status and angular positions as signature data for said loaded work piece; and means in said digital electronic means for sequentially comparing said loaded work piece signature data with said unique signature data for each type of work piece.

4. A system according to claim 3 further comprising means in said digital electronic means for transmitting an electronic signal upon determination of a match of said loaded work piece signature data and said unique signature data.

5. A system according to claim 3 further comprising a plurality of unique messages stored in the digital electronic means and means in the digital electronic means for electronically transmitting a one of said unique messages which corresponds to said loaded work piece upon determination of a match of said loaded work piece signature data and said unique signature data.

6. A system according to claim 5 further comprising means for visually displaying said transmitted unique message.

7. A system according to claim 3 further comprising means in said digital electronic means for transmitting an electronic signal upon determination that said loaded work piece signature data does not match said unique signature data.

8. A system according to claim 7 further comprising means for aborting further rotation of the chuck in response to said transmitted electronic signal.

9. A system according to claim 3 further comprising:

a unique message stored in said digital electronic means; and means in said digital electronic system for electronically transmitting said unique message upon determination that said loaded work piece signature data does not match said unique signature data.

10. A system according to claim 9 further comprising means for visually displaying said transmitted unique message.

11. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition method comprising the steps of:

continuously transmitting a beam of light in a constant non-sweeping path toward the work piece and in the second reference plane during at least a part of one revolution of the chuck;

receiving portions of said beam of light passing through the unique pattern of passages in the work piece as the work piece rotates through said at least a part of one revolution; and generating electrical signals to the digital electronic means in response to received portions of said beam of light.

12. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition method comprising the steps of:

loading a work piece on the chuck at the first angular reference plane;

rotating the chuck and loaded work piece for at least a part of one revolution;

continuously transmitting a beam of light in a constant non-sweeping path toward the loaded work piece in the second reference plane during said at least a part of one revolution of the chuck;

receiving all portions of said beam of light which pass through the unique pattern of passages in said loaded work piece as said work piece rotates through said at least a part of one revolution;

generating an electrical signal in response to said received portions of said beam of light; and detecting angular positions of said loaded work piece and status of said electrical signal as present and absent in relation to the first reference plane for each change in said status of said electrical signal; and storing said detected status and angular positions to provide signature data for said loaded work piece.

13. For identifying the type of work piece loaded onto a rotating tool shaft chuck having digital electronic means connected thereto for supplying control signals controlling the angular displacement of the chuck in relation to a first reference plane containing a rotational axis of the chuck, each type of work piece having a unique pattern of passages therethrough on a plane transverse to a rotational axis of the work piece which rotate into and out of alignment with a single line in the plane, the plane for each type of work piece intersecting its rotational axis at a point so as to be aligned with a second reference plane relative to the chuck on which the work piece is loaded and the lines for each type of work piece being coincident in relation to the rotational axis of the chuck, a recognition method comprising the steps of:

storing unique signature data for each type of work piece in the digital electronic means;

loading a work piece on the chuck at the first angular reference plane;

rotating the chuck and loaded work piece for at least a part of one revolution;

continuously transmitting a beam of light in a constant non-sweeping path toward the loaded work piece in the second reference plane during said at least a part of one revolution of the chuck;

receiving all portions of said beam of light which pass through the unique pattern of passages in said loaded work piece as said work piece rotates through said at least a part of one revolution;

generating an electrical signal in response to said received portions of said beam of light;

detecting angular positions of said loaded work piece and status of said electrical signal as present and absent in relation to the first reference plane for each change in said status of said electrical signal;

storing said detected status and angular positions to provide signature data for said loaded work piece;

sequentially comparing said loaded work piece signature data with said unique signature data for each type of work piece.

14. A method according to claim 13 further comprising the step of transmitting an electronic signal upon determination of a match of said loaded work piece signature data and said unique signature data.

15. A method according to claim 13, the digital electronic means having a plurality of unique messages stored therein, further comprising the step of electronically transmitting a one of said unique messages which corresponds to said loaded work piece upon determination of a match of said loaded work piece signature data and said unique signature data.

16. A method according to claim 15 further comprising the step of visually displaying said transmitted unique message.

17. A method according to claim 13 further comprising the step of transmitting an electronic signal upon determination that said loaded work piece signature data does not match said unique signature data.

18. A method according to claim 17 further comprising the step of aborting further rotation of the chuck in response to said transmitted electronic signal.

19. A method according to claim 13, the digital electronic means having a unique message stored therein, further comprising the step of electronically transmitting said unique message upon determination that said loaded work piece signature data does not match said unique signature data.

20. A method according to claim 19 further comprising the step of visually displaying said transmitted unique message.

* * * * *